United States Patent
Park et al.

(10) Patent No.: US 12,054,872 B2
(45) Date of Patent: Aug. 6, 2024

(54) LAUNDRY TREATMENT MACHINE AND METHOD FOR CONTROLLING THE SAME

(71) Applicant: LG ELECTRONICS INC., Seoul (KR)

(72) Inventors: Wonseok Park, Seoul (KR); Junsung Kim, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 776 days.

(21) Appl. No.: 17/258,219

(22) PCT Filed: Jul. 5, 2019

(86) PCT No.: PCT/KR2019/008295
§ 371 (c)(1),
(2) Date: Jan. 6, 2021

(87) PCT Pub. No.: WO2020/009536
PCT Pub. Date: Jan. 9, 2020

(65) Prior Publication Data
US 2021/0285141 A1 Sep. 16, 2021

(30) Foreign Application Priority Data

Jul. 6, 2018 (KR) .................. 10-2018-0079057

(51) Int. Cl.
*D06F 33/42* (2020.01)
*D06F 23/04* (2006.01)
(Continued)

(52) U.S. Cl.
CPC .............. *D06F 33/42* (2020.02); *D06F 23/04* (2013.01); *D06F 34/10* (2020.02); *D06F 37/30* (2013.01);
(Continued)

(58) Field of Classification Search
CPC .......... D06F 23/04; D06F 33/42; D06F 39/08; D06F 33/48; D06F 39/085; D06F 34/10;
(Continued)

(56) References Cited

U.S. PATENT DOCUMENTS

| 2007/0113595 | A1 | 5/2007 | Harwood et al. |
| 2013/0174877 | A1 * | 7/2013 | Chapman ............ A47L 15/0031 134/25.2 |
| 2016/0058263 | A1 * | 3/2016 | Miller ................. A47L 15/0052 134/18 |

FOREIGN PATENT DOCUMENTS

| EP | 1783264 A2 * | 5/2007 | ............ D06F 33/02 |
| JP | H09-108493 | 4/1997 | |

(Continued)

OTHER PUBLICATIONS

International Search Report (with English Translation) and Written Opinion (with English Translation) dated Oct. 25, 2019 issued in Application No. PCT/KR2019/008295.
(Continued)

*Primary Examiner* — Benjamin L Osterhout
(74) *Attorney, Agent, or Firm* — KED & Associates LLP

(57) ABSTRACT

The present disclosure relates to a laundry treatment machine. A pump motor provided in a drain pump is controlled to correspond to the operation of the main motor and the water level, so that the pump motor slows down based on the speed of rotation of the main motor and the water level and keeps operating at low speed. Therefore, the pump motor is able to keep operating without stopping operation, and the amount of noise caused by the start-up of the motor is reduced, and the time taken to align the rotor of the motor in position is reduced, thereby reducing drainage time and improving the drainage performance of the drain pump.

18 Claims, 12 Drawing Sheets

(51) Int. Cl.
  *D06F 34/10* (2020.01)
  *D06F 37/30* (2020.01)
  *D06F 39/08* (2006.01)
  *F04D 13/06* (2006.01)
  *F04D 15/00* (2006.01)
  *H02P 23/14* (2006.01)
  *D06F 33/48* (2020.01)
  *D06F 103/18* (2020.01)
  *D06F 103/24* (2020.01)
  *D06F 105/08* (2020.01)
  *D06F 105/46* (2020.01)
  *H02P 29/20* (2016.01)

(52) U.S. Cl.
  CPC ............ *D06F 37/304* (2013.01); *D06F 39/08* (2013.01); *D06F 39/085* (2013.01); *D06F 39/087* (2013.01); *F04D 13/06* (2013.01); *F04D 15/0066* (2013.01); *H02P 23/14* (2013.01); *D06F 33/48* (2020.02); *D06F 2103/18* (2020.02); *D06F 2103/24* (2020.02); *D06F 2105/08* (2020.02); *D06F 2105/46* (2020.02); *H02P 29/20* (2016.02)

(58) Field of Classification Search
  CPC ...... D06F 37/30; D06F 37/304; D06F 39/087; D06F 2103/24; D06F 2105/46; D06F 2105/08; D06F 2103/18; H02P 23/14; H02P 29/20; F04D 13/06; F04D 15/0066
  See application file for complete search history.

(56) References Cited

FOREIGN PATENT DOCUMENTS

| | | |
|---|---|---|
| JP | H10-272284 | 10/1998 |
| JP | 2009-066189 | 4/2009 |
| JP | 2010-253099 | 11/2010 |
| JP | 2013-052127 | 3/2013 |
| KR | 10-1999-0026926 | 4/1999 |
| KR | 10-2011-0013172 | 2/2011 |
| KR | 10-2011-0112486 | 10/2011 |
| KR | 10-1756408 | 7/2017 |

OTHER PUBLICATIONS

Korean Notice of Allowance dated Sep. 25, 2023 issued in Application No. 10-2018-0079057.

\* cited by examiner

FIG. 8
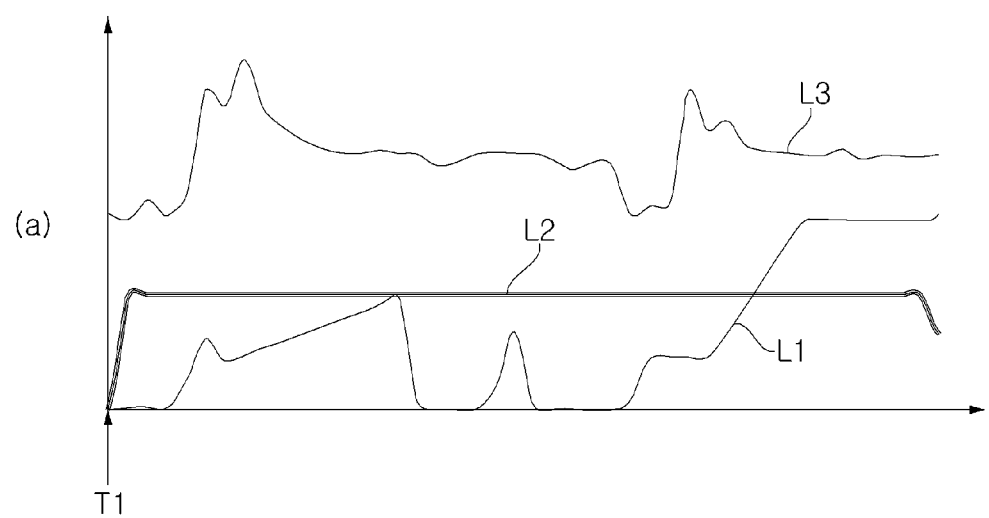
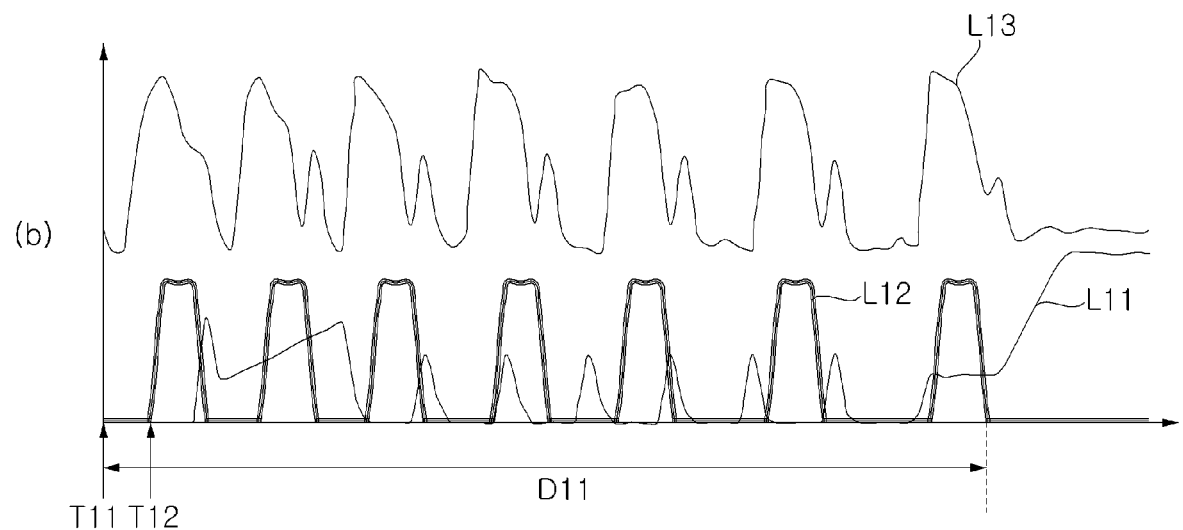

LAUNDRY TREATMENT MACHINE AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2019/008295, filed Jul. 5, 2019, which claims priority to Korean Patent Application No. 10-2018-0079057, filed Jul. 6, 2018, whose entire disclosures are hereby incorporated by reference.

BACKGROUND OF THE DISCLOSURE

1. Field of the Disclosure

The present disclosure relates to a laundry treatment machine, and more particularly, to a laundry treatment machine capable of reducing noise generated during drainage and a method for controlling the same.

2. Description of the Related Art

A laundry treatment machine includes a drain pump to drain wash water. A drain pump driving apparatus drives a motor during drainage to discharge water introduced into a water introduction part to the outside.

In order to drive the drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Meanwhile, the drain pump may idle based on the amount of water entering the drain pump during drainage.

As the amount of water entering the drain pump decreases, air, along with the water, is introduced, and the motor of the drain pump idles, thus generating noise. Although the speed of rotation of the drain pump is increased, the amount of wash water is decreased, and this leads to a reduction in drainage performance and a significant increase in noise.

Also, the drain pump operates according to the water level or the operation of the main motor, and the drain pump turns on and off repeatedly due to the on and off operations of the main motor. Also, repeated increases and decreases of the level of wash water may cause the drain pump to turn on and off repeatedly. In case in which the drain pump is started up after stopping operation, noise may be generated due to the initial start-up of the drain motor.

Particularly, there is a need to eliminate the noise caused by the start-up of the drain pump since noise is generated in the process in which the drain motor of the drain pump is started up after alignment.

SUMMARY

The present disclosure provides a laundry treatment machine capable of reducing noise caused by the start-up of a drain pump during drainage of wash water and a method for controlling the same.

The present disclosure also provides a laundry treatment machine with a drain pump capable of driving in a sensorless manner and a method for controlling the same.

An embodiment of the present disclosure provides a laundry treatment machine including: a main motor to rotate a washing tub; a pump motor to operate a pump; a pump driving apparatus to drive the pump motor; and a main controller that operates the pump motor separately in a first period for stopping the pump motor, a second period for aligning the rotor of the pump motor, and a third period for increasing the speed of rotation of the pump motor after the second period.

The pump drains the wash water introduced while the pump motor is operating at the first speed, in case in which the pump motor operates at the second speed.

An embodiment of the present disclosure provides a laundry treatment machine including: a main motor to rotate a washing tub; a pump motor to operate a pump; a pump driving apparatus to drive the pump motor; and a main controller that controls the pump motor to operate at a second speed during dewatering to drain wash water and to slow down to a first speed, which is lower than the second speed, in case in which the speed of the main motor decreases to below a set speed and the water level decreases.

An embodiment of the present disclosure provides a method for controlling a laundry treatment machine, the method including: draining wash water by a pump by driving a pump motor; starting dewatering by driving a main motor; in case in which the speed of rotation of the main motor is below a set speed during dewatering, slowing down the pump motor to a first speed and operating the same at the first speed; detecting the level of wash water; and in case in which the level of wash water increases, speeding up the pump motor to a second speed.

The method may further include, in case in which the level of wash water is below a set water level, slowing down the pump motor to the first speed and maintaining the speed of the pump motor at the first speed.

The method may further include, in case in which the main motor is stopped during dewatering, slowing down the pump motor to the first speed and maintaining the speed of the pump motor at the first speed.

ADVANTAGEOUS EFFECTS

A laundry treatment machine and a method for controlling the same according to an embodiment of the present disclosure have the effect of reducing noise generated during drainage since the speed of the drain pump is controlled during drainage so that the drain pump continuously operates without stopping operation.

The present disclosure may reduce noise caused by the start-up of the drain pump by improving the repeated on and off operations of the drain pump.

The present disclosure may solve the problem of restarting of the drain pump after stopping, since the drain pump slows down and operates at a low speed without stopping operation through speed control.

The present disclosure has the effect of enabling fast operation and reducing drainage time since the drain pump operates at low speed without stopping.

The present disclosure has the effect of improving drainage performance by performing continuous operation by varying the speed of the drain pump.

BRIEF DESCRIPTION OF THE DRAWINGS

The above and other objects, features and other advantages of the present disclosure will be more clearly understood from the following detailed description taken in conjunction with the accompanying drawings, in which:

FIG. 8 is a view illustrating changes in speed and noise during operation of a pump motor.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
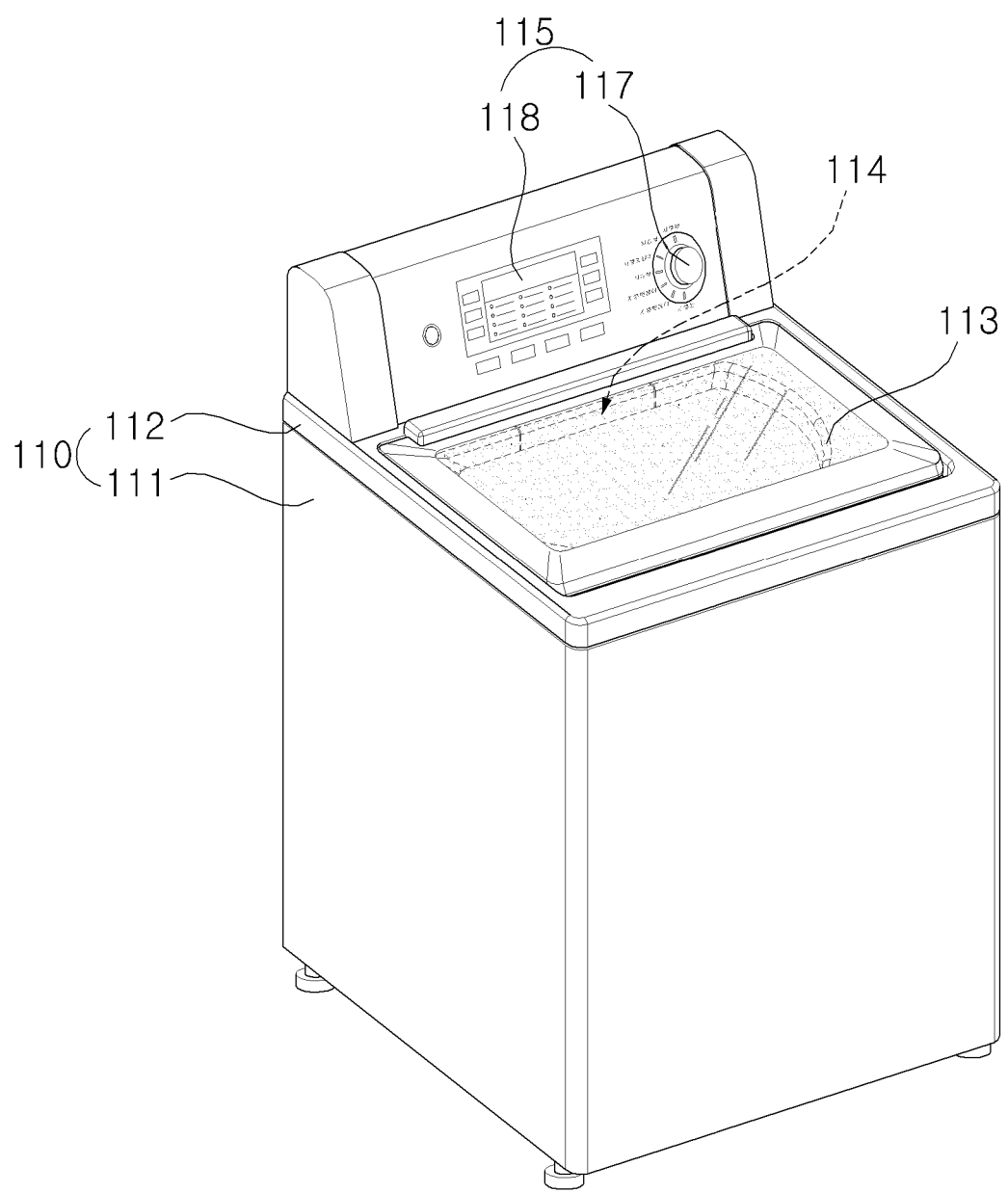
FIG. 1 is a perspective view illustrating a laundry treatment machine according to an embodiment of the present disclosure.
Figure 2:
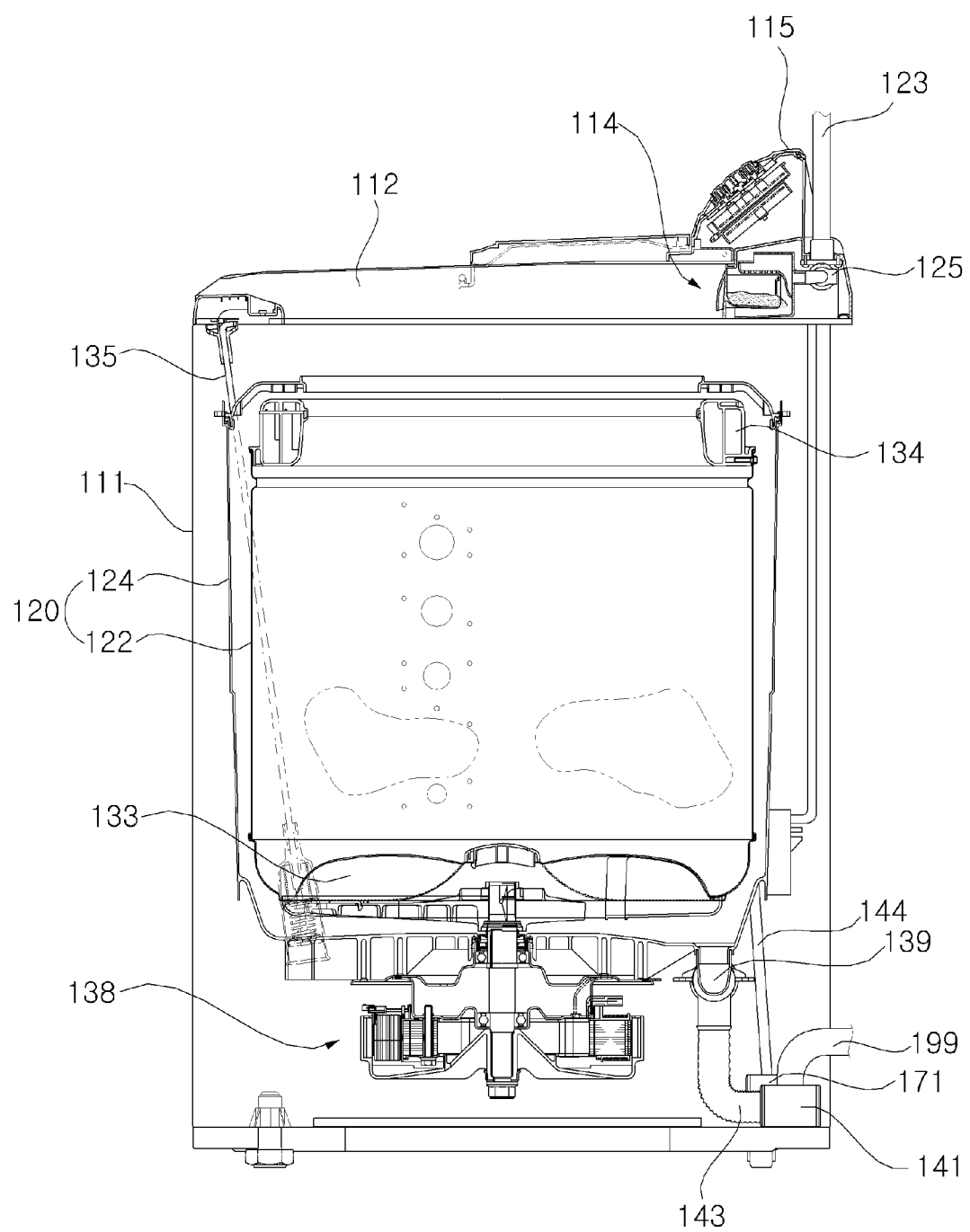
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
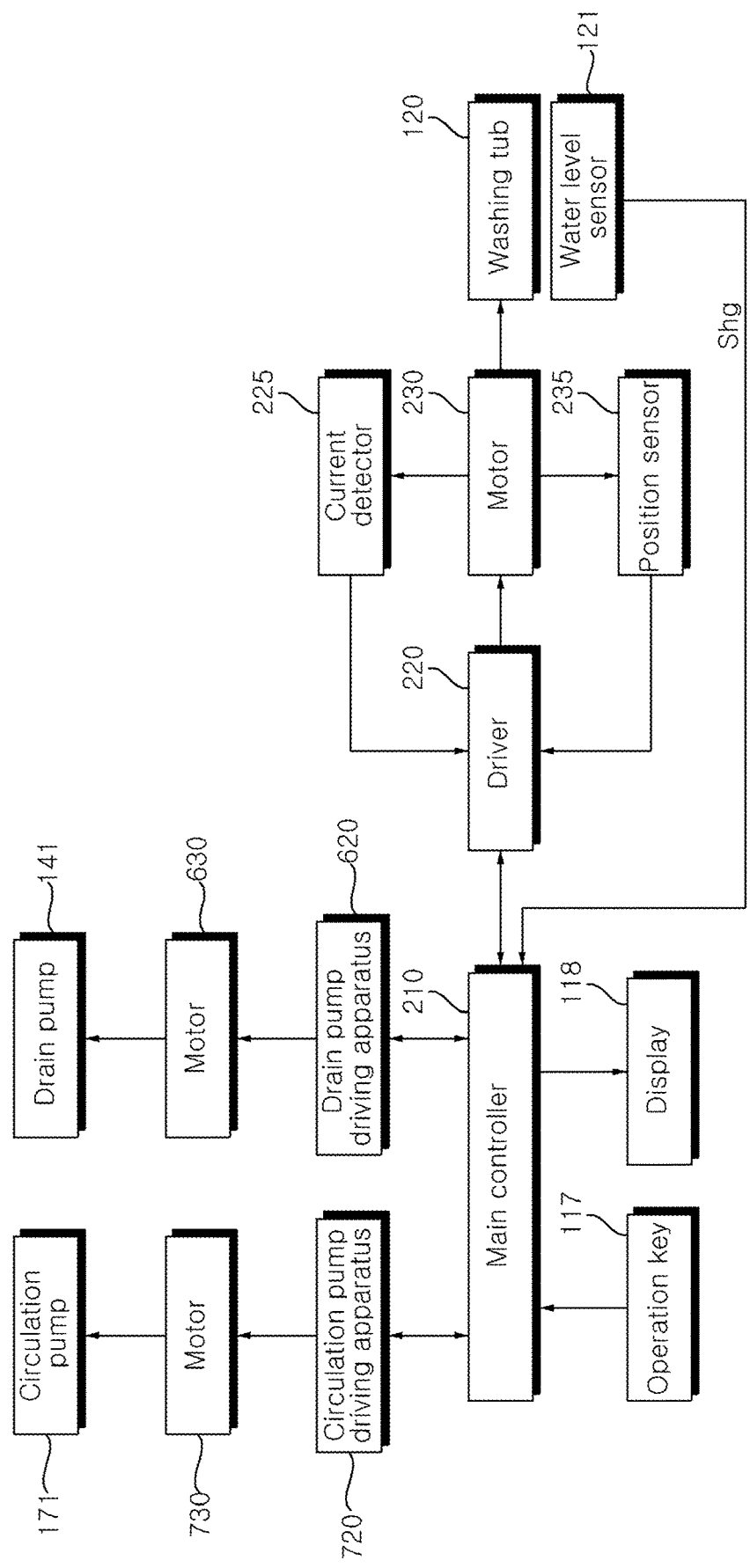
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the drain pump 141 and a drain pump driving apparatus 620 for driving the motor 630. The drain pump driving apparatus 620 may be controlled by the main controller 210.

Also, the laundry treatment machine 100 may include a motor 730 for driving the circulation pump 171 and a circulation pump driving apparatus 720 for driving the motor 730. The circulation pump driving apparatus 720 may be controlled by the main controller 210.

In case in which necessary, the motor 230 for spinning the washing tub may be described as a main motor, the motor 630 for operating the drain pump may be described as a drain motor, and the motor 730 for operating the circulation pump may be described as a circulating motor.

In this specification, the drain pump driving apparatus 620 may be referred to as a pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
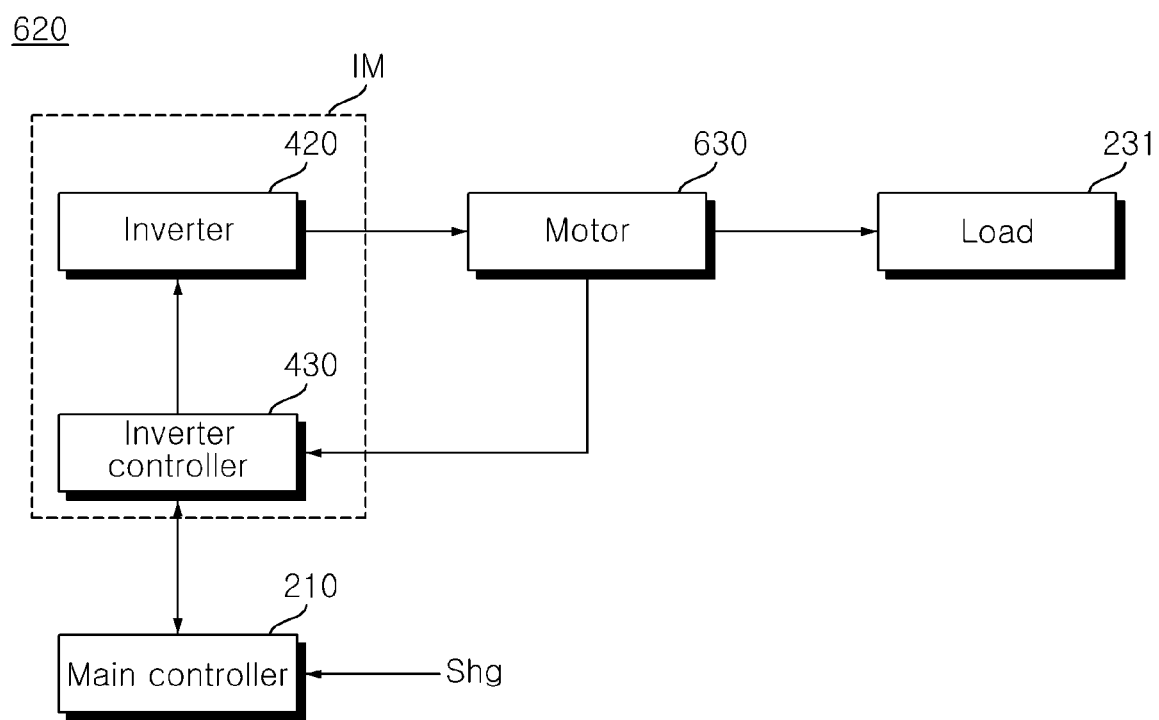
FIG. 4 illustrates an example of an internal block diagram of a drain pump driving apparatus of FIG. 1.
Figure 5:
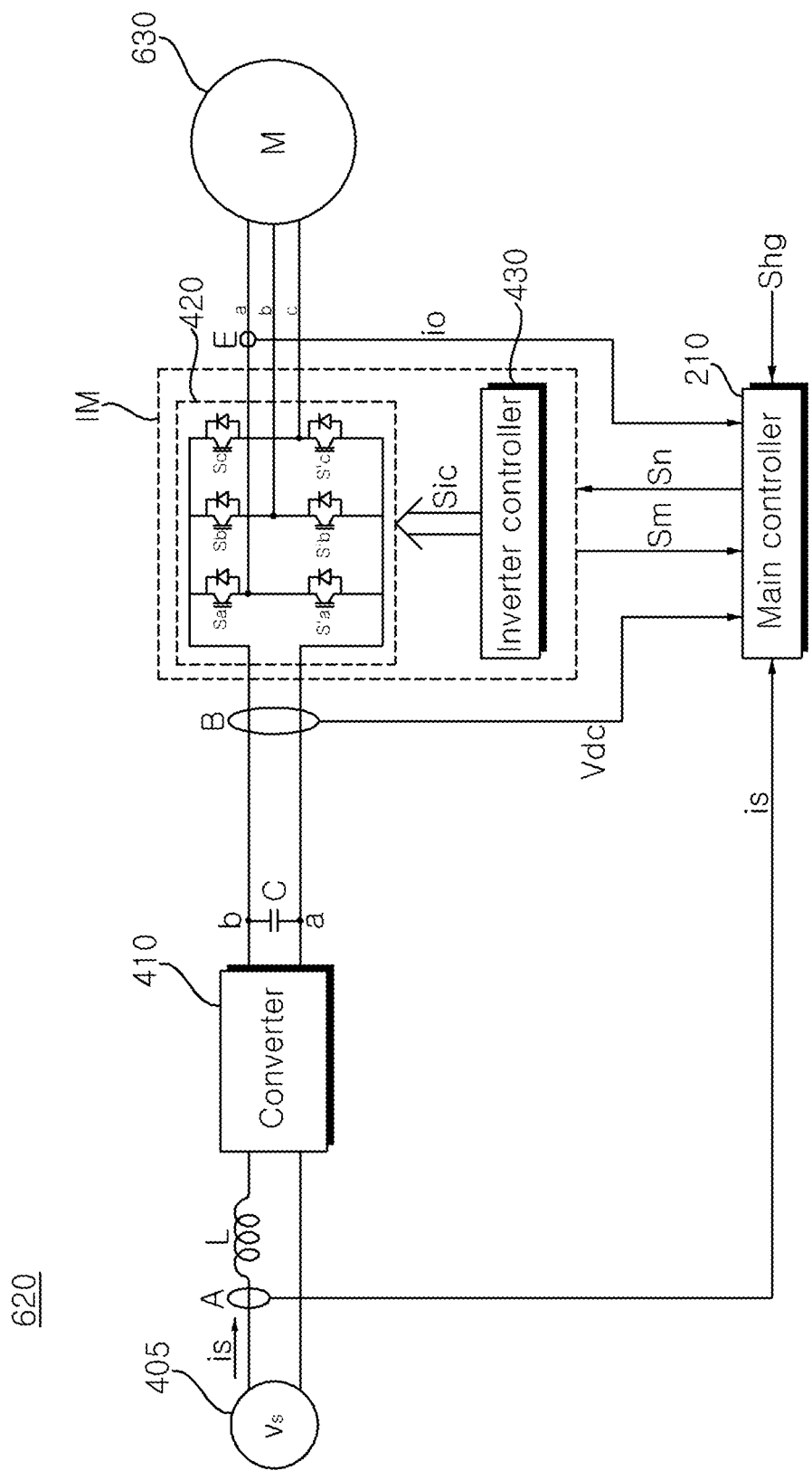
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

The circulation pump 171 may be internally configured in the same manner as the drain pump, except for the hose connection, and operate on the same principle. A description of the configuration and operation of the circulation pump may be omitted below.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is is input from the commercial AC voltage source 405. To this end, a current transformer (CT), a shunt resistor, or the like may be used as the input current detector A. The detected input current is is may be input to the inverter controller 430 or the main controller 210 as a discrete signal in the form of a pulse. In FIG. 5, it is illustrated that the detected input current is is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies based on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed power. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current idc detected by the output current detector E and a DC terminal voltage Vdc detected by the DC terminal voltage detector B.

The main controller 210 may calculate a power based on the output current idc and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current idc flowing in the 3-phase motor 630.

The output current E may be disposed between the DC terminal capacitor C and the inverter 420 to detect an output current idc flowing in the motor.

Particularly, the output current detector E may have one shunt resistance element Rs.

Meanwhile, the output current detector E may use one shunt resistance element Rs to detect phase current ia, ib, and ic, which is the output current idc flowing in the motor 630, when the lower arm switching element of the inverter 420 is turned on.

The detected output current idc may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
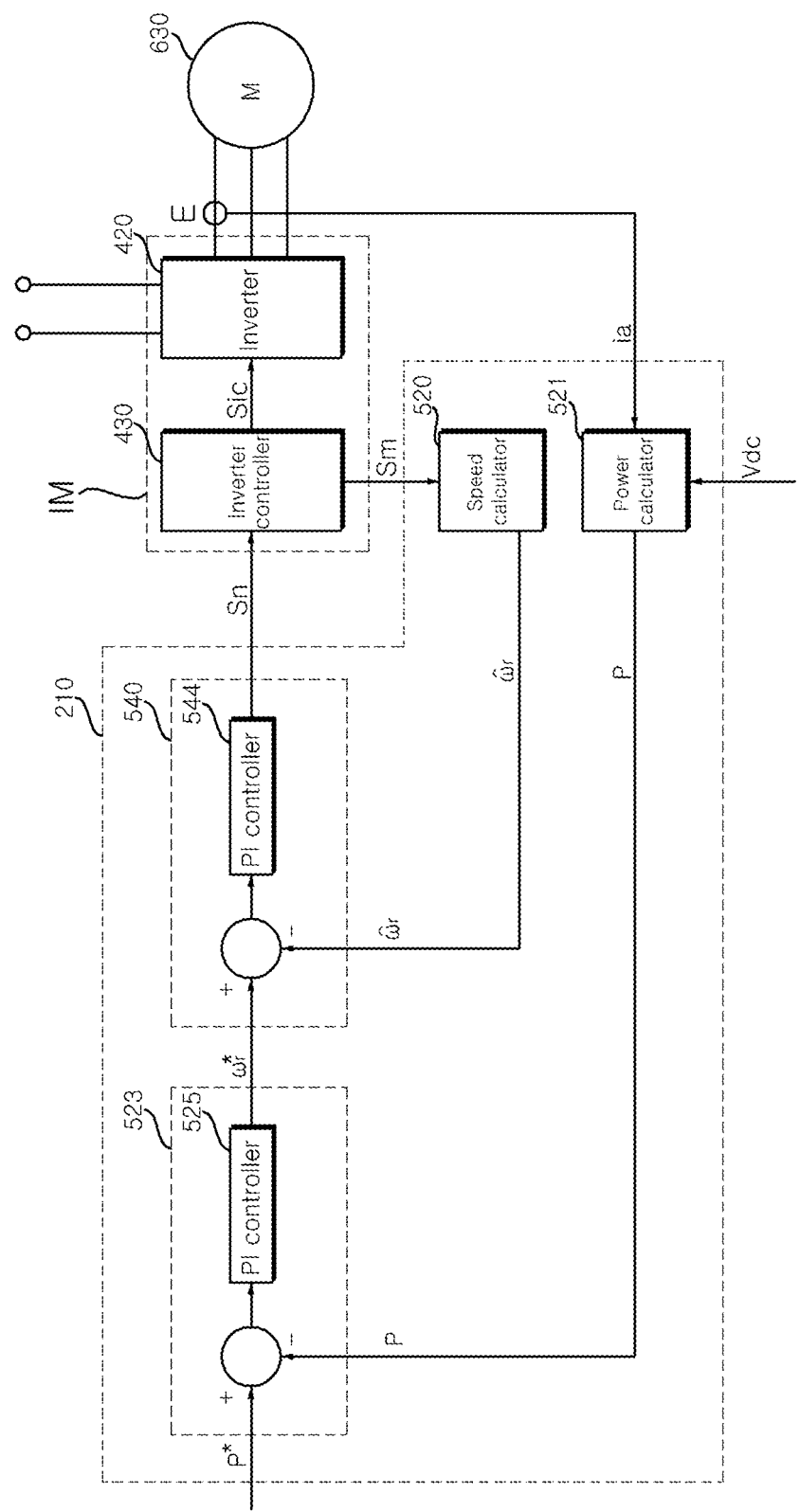
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, the main controller 210 according to the embodiment of the present disclosure may control such that, during drainage, the motor 630 is driven with first power in case in which the lift, which is the difference between the level of water in a water introduction part introduced into the drain pump 141 and the level of water in a water discharge part discharged from the drain pump 141, is at a first level, and the motor 630 is driven with the first power in case in which the lift is at a second level which is higher than the first level. Accordingly, water lifting can be done smoothly even in case in which the lift varies during drainage.

Particularly, since the power control allows for driving at constant power, the converter 410 supplies constant power, thereby improving the stability of the converter 410.

Meanwhile, the main controller 210 according to the embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to the embodiment of the present disclosure may control such that, when the speed of the motor 630 increases, a period in which the speed of the motor 630 increases includes an initial rise period and a second rise period in which the speed of the motor 630 rises more sluggishly than in the initial rise period. Particularly, it may control the output current idc to be constant during the second rise period. Accordingly, the motor 630 may operate at constant power.

Meanwhile, the main controller 210 according to the embodiment of the present disclosure may control such that, during drainage, the speed of the motor 630 increases as the level of the lift increases.

Meanwhile, the main controller 210 according to the embodiment of the present disclosure may control such that, during drainage, the amount of water lifted by the operation of the drain pump 141 decreases as the level of the lift increases.

Meanwhile, the main controller 210 according to the embodiment of the present disclosure may control such that, during drainage, the speed of the motor 630 increases as the level of water in the washing tub 120 decreases.

Meanwhile, the main controller 210 according to the embodiment of the present disclosure may control such that the reduction in the amount of water lifted by the operation of the drain pump 141 caused by the increase in the level of the lift is smaller in the power control of the motor 630 than in the speed control of the motor 630. Accordingly, the level of the lift that can be installed becomes higher as compared to the speed control, thereby increasing the degree of freedom of installation.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current idc is at a smaller level. Accordingly, the motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may control such that, during drainage, the speed of the drain motor 630 increases in case in which the power supplied to the motor 630 does not reach the first power and the speed of the drain motor 630 decreases in case in which the power supplied to the motor 630 exceeds the first power. Accordingly, since the power control allows for driving at constant power, the converter supplies constant power, thereby improving the stability of the converter. Also, the power control allows for minimizing a decrease in drainage performance according to installation conditions.

Meanwhile, the main controller 210 according to another embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to another embodiment of the present disclosure may control such that, during drainage, the speed of the motor 630 increases as the level of the lift, which is the difference between the level of water in a water introduction part introduced into the drain pump 141 and the level of water in a water discharge part discharged from the drain pump 141, increases. Accordingly, water lifting can be done smoothly even in case in which the lift varies during drainage. Particularly, the power control allows for minimizing a decrease in drainage performance according to installation conditions.

Meanwhile, the main controller 210 according to another embodiment of the present disclosure may control such that, during drainage, the speed of the motor 630 increases as the level of water in the washing tub 120 decreases. Accordingly, water lifting can be done smoothly even in case in which the lift varies during drainage.

Figure 7:
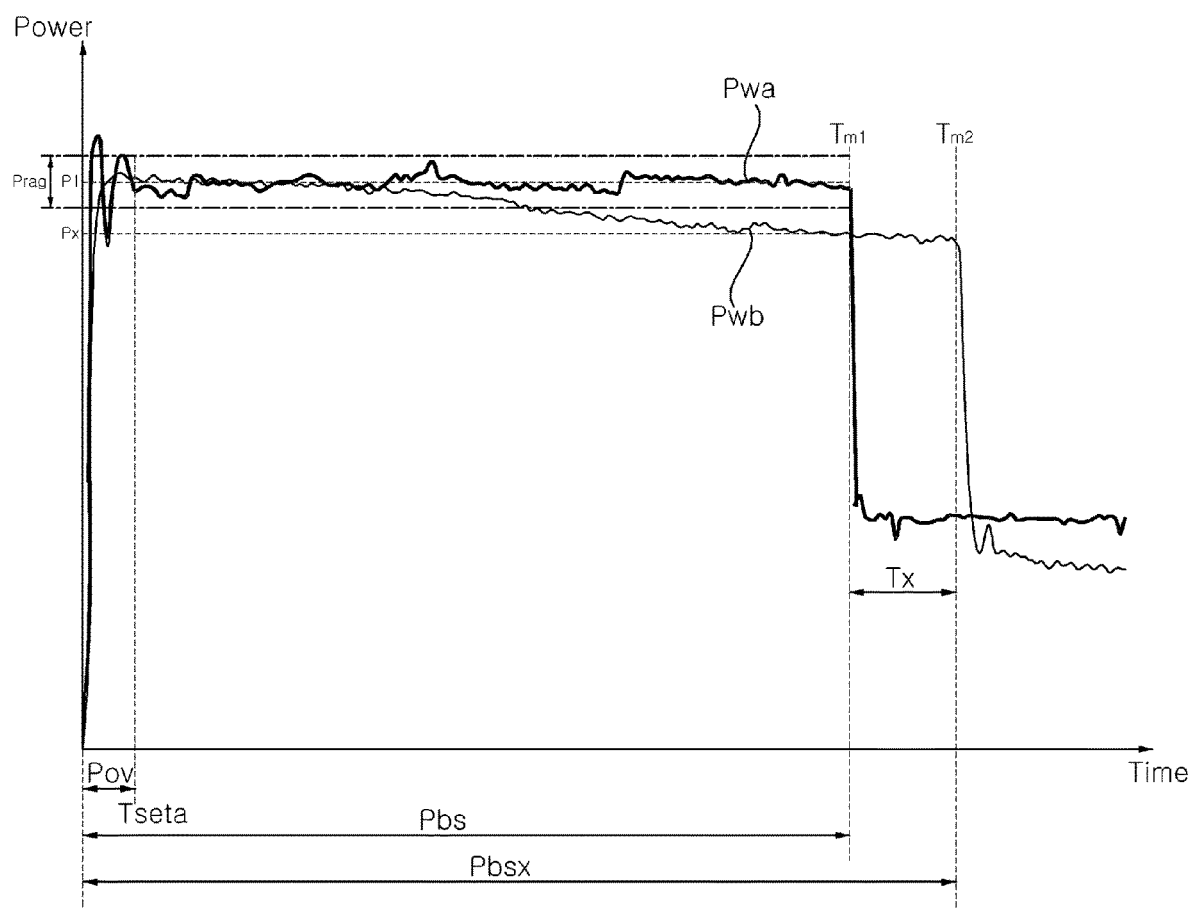
FIG. 7 is a view referred to in the description of a method for operating a pump driving apparatus.

FIG. 7 is a view showing power supplied to a motor according to power control and speed control.

When the power control is performed as in the embodiments of the present disclosure, a time-dependent waveform of the power supplied to the motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the motor 630, during the drainage, to be constant without decreasing over time, although the water level in the washing tub 120 decreases.

By performing the power control, the main controller 210 may control the power supplied to the motor 630, during the drainage, to be the first power P1.

In particular, even in case in which the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the motor 630 is driven with a power within the first allowable range Prag based on the first power P1 from time point Tseta until time point Tm1 when the drainage is completed, excluding an overshooting period Pov. Accordingly, water pumping can be performed smoothly even in case in which the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a first level, the main controller 210 may control the motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current idc and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current idc is at a smaller level. Accordingly, the motor 630 can be driven with a constant power.

Meanwhile, the main controller 210 may control the speed of the motor 630 to increase as the level of the lift increases. Accordingly, water lifting can be done smoothly even in case in which the lift varies during drainage. Particularly, the power control allows for minimizing a decrease in drainage performance according to installation conditions.

Meanwhile, the main controller 210 may control such that, during drainage, the speed of the motor 630 increases as the level of water in the washing tub 120 decreases. Accordingly, water lifting can be done smoothly even in case in which the lift varies during drainage.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In the drawing, it is illustrated that the speed control is performed until time point Tm2, and the speed control is terminated at time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 7, it is illustrated that, during a speed control period Pbsx, the power supplied to the motor 630 is gradually reduced up to approximately Px at time point Tm2 when the drainage is completed.

Accordingly, the time when the operation of the motor 630 is terminated in a case where the speed control is performed is Tm2, which is delayed approximately by the period Tx, when compared to that in a case where the power control is performed. Moreover, the power supplied from the converter 410 may be kept constant, thereby improving the operational stability of the converter 410.

Consequently, according to the embodiment of the present disclosure, the drainage time is reduced approximately by the period Tx when power control is performed, as compared to when speed control is performed.

Meanwhile, the operations of the pump driving apparatus and pump motor according to the present disclosure may apply equally to the circulation pump and the circulation motor, as well as the drain pump and the drain motor.

The drain pump driving apparatus 620 according to the embodiment of the present disclosure may be applied to various machines such as dishwashers and air conditioners, in addition to the laundry treatment machine 100 and 100b.

FIG. 8 is a view illustrating changes in speed and noise during operation of a pump motor.

Referring to FIG. 8, an eleventh graph L11 is a graph showing the speed of rotation of the main motor, a twelfth graph L12 is a graph showing the speed of rotation of the drain pump, and a thirteenth graph L13 is a graph showing noise generated from the laundry treatment machine.

As shown in FIG. 8, during dewatering, the main controller dewaters wash water contained in laundry by increasing the speed of the main motor in stages. In case in which unbalance occurs to the spinning of the washing tub during dewatering due to tangling of the laundry, the washing tub cannot be spun at high-speed. Thus, the main controller may discharge part of the wash water contained in the laundry by spinning the washing tub at low speed before starting dewatering, and may set the speed of dewatering by deciding whether high speed spinning is possible or not through eccentric detection.

By repeatedly rotating the main motor for a certain amount of time, stopping and rotating it again, noise is generated from the main motor. Also, when wash water is drained from the laundry by the rotation of the main motor, the drain pump is actuated to drain the increased quantity of wash water.

As shown in the drawing, as the drain motor repeatedly goes into operation and stops operation along with the repeated operation and stopping of the main motor, start-up noise is generated from the motor.

The drain pump also repeatedly turns on and off in response to the operation of the main motor during the eleventh period D11 in which the main motor turns on and off after start-up.

For example, when repeatedly stopping after one spin cycle in order to detect the quantity of laundry before dewatering the laundry at high speed, when an eccentricity of laundry is detected, and when detangling the laundry, the main motor may repeatedly turn on and off. Also, when the main motor rotates while maintaining a constant speed or the main motor rotates at a low speed which is below or equal to a predetermined speed, the drain pump may repeatedly turn on and off.

At this point, as shown in the thirteenth graph L13, noise may be generated from the laundry treatment machine in response to the on and off operations of the drain pump.

In addition to the noise generated by the start-up of the main motor, much noise is generated at the start-up of the drain motor along with the on and off operations of the drain pump.

The noise increases from the first level SL1 to the third level SL3 at the start-up of the drain motor, and decreases to the first level when the drain motor is stopped.

For example, in case in which the washing tub spins during drainage, noise caused by the spinning of the washing tub and noise caused by the drain pump may add up to about 51 dB of noise. Also, about 37 dB of noise is generated by drainage even when the washing tun is stopped. In case in which the drain motor stops operation and is re-started as described above, the position of the rotor needs to be aligned while the rotor is at a complete stop, thus generating noise in the process of aligning the rotor in position and initially starting it.

As much noise is generated upon start-up from the drain motor as well as the main motor, the main controller may control the speed of rotation of the drain motor to keep it operating, rather than repeatedly stopping and then starting it, during the on and off operations of the drain motor.

Figure 9:
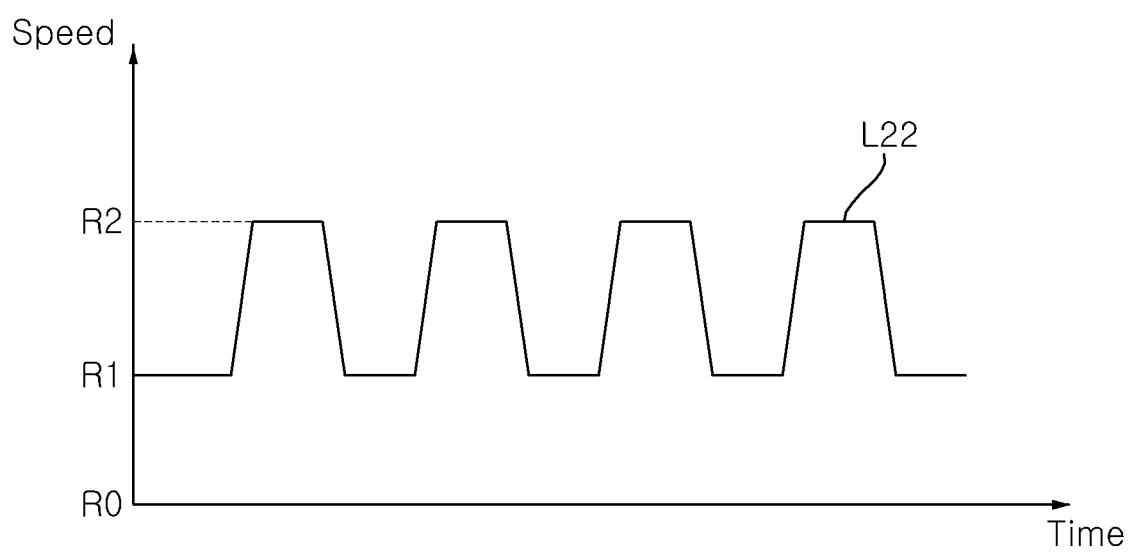
FIG. 9 is a view referred to describe the speed of the pump of a laundry treatment machine according to an embodiment of the present disclosure.

FIG. 9 is a view referred to describe the speed of the pump of a laundry treatment machine according to an embodiment of the present disclosure. Referring to FIG. 8, the main controller applies a control signal to the drain pump driving apparatus to control the speed to keep the drain pump from stop operating during the on and off operations of the drain pump.

When the main motor repeatedly turns on and off, or when the main motor rotates at low speed, or when the drain pump repeatedly turns on and off based on the amount of wash water, the main controller may control the drain pump to slow down to a set speed without stopping operation and then speed up.

When stopping the drain motor by stopping the main motor, the main controller slows down the speed of rotation of the drain motor to a preset first speed R1I, without stopping the drain motor. In case in which dewatering is not completed, the main controller controls the drain motor to operate at the first speed without stopping it, even when the main motor is stopped. The drain motor maintains the first speed even when the main motor is turned off.

The main controller controls the drain motor to speed up to a second speed greater than the first speed, and operate at the second speed, when the main motor is operated.

Accordingly, the drain pump is able to maintain its operating state during dewatering without stopping operation.

Moreover, the main controller sets the drain motor to operate at the second speed when the water level increases and to operate at the first speed when the water level decreases.

The drain pump driving apparatus controls the drain motor to slow down to the first speed R1 and then speed up to the second speed R2, in response to a control signal. In case in which the wash water is at or above a certain water level when the speed of the drain motor is increased, the drain motor may be controlled to operate at the second speed or above. In this case, when the speed of the drain motor goes down and up, the slope in speed may be kept constant, and its value may be set differently. In case in which required, the speed may be set to have the same slope.

Accordingly, the speed of the drain motor goes up or down within a set range from the first speed to second speed, and this causes the drain motor to operate without stopping.

Figure 10:
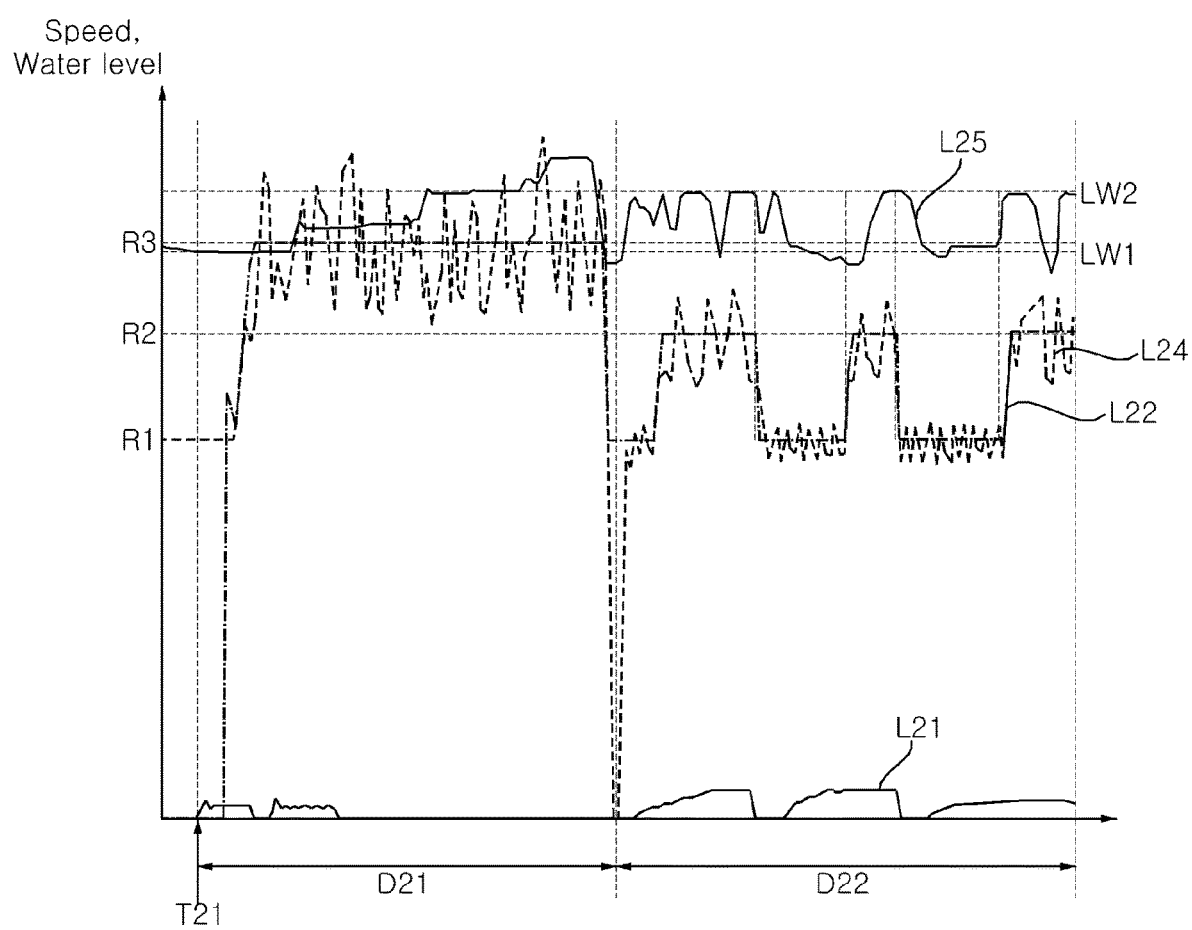
FIG. 10 is a view illustrating changes in the operation and water level of the pump through pump control of FIG. 9.

When the speed of the drain motor goes down to the first speed, the wash water in the washing tub is introduced into the pump, and when the speed of the drain motor goes up to the second speed, the introduced wash water is drained. FIG. 10 is a view illustrating changes in the operation and water level of the pump through pump control of FIG. 9. A twenty-first graph L21 is a graph showing the speed of the main motor, a twenty-fifth graph L25 is a graph showing changes in water level, and a twenty-third graph L24 is a graph showing the speed of the drain motor.

As shown in FIG. 10, when the speed of the drain motor goes up or down to the first speed R1 or second speed R2 during dewatering, without being stopped, the level of wash water is changed.

The level of wash water increases when the main motor rotates and wash water is drained from the laundry by the rotation, and the level of wash water decreases when wash water is drained through the drain pump by the operation of the drain motor. The smaller the value of the water level illustrated, the higher the water level, and the greater the value of the water level illustrated, the lower the water level.

When draining wash water after completing a wash or rinse cycle (T21), the main controller stops the main motor and operates the drain pump to drain the wash water as in the twenty-first period D21.

During drainage, the drain motor speeds up from the first speed R1 to a third speed R3 and operates at the third speed, and therefore drains the wash water. Accordingly, the water level is decreased.

Once the drainage is started, the main controller may set the speed of the drain motor to the third speed in case in which the water level of wash water is above a second water level, which is a set water level or higher, and may slow down the speed of the drain motor in case in which the water level decreases. In case in which the water level of wash water is between the second water level and the set water level, the drain motor may be set to the second speed, or in case in which the level of wash water is below the set water level, the drain motor may be set to the first speed.

When dewatering is started as the main motor is operated, the drain motor and the main motor are operated during the twenty-second period D22. Thus, the wash water contained in the laundry is released to the washing tub, and the released wash water is drained through the drain pump.

During the initial drainage in the twenty-first period D21, the drain motor temporarily stops operation when the water level decreases, and resumes operation when the dewatering is started again.

The drain motor operates at either the first speed or the second speed in response to the speed and water level of the main motor, and accordingly the drain pump drains wash water through a drain hose.

The main controller sets the drain motor to keep operating even when the main motor is stopped. The drain pump driving apparatus controls the drain motor to operate at the first speed in response to a control command from the main controller.

Once the main motor is operated, the drain pump driving apparatus controls the speed of the drain motor to go up to the second speed and maintain the second speed, and controls the drain motor to slow down to the first speed and maintain the first speed when the main motor is stopped.

Moreover, in case in which the speed of the main motor is at a predetermined speed or below, the drain pump driving apparatus may allow the drain motor to maintain the first speed without speeding it up to the second speed.

When the drain motor operates at the first speed, wash water is introduced into the drain pump, and when the drain motor speeds up to the second speed, wash water is drained from the drain pump. This process is repeated.

Furthermore, in case in which the speed of the main motor goes up to a set speed or above, the main controller may set the mode of the drain pump based on the speed of the main motor and control the speed so that the drain motor operates at the first to third speeds based on the mode.

FIG. 10 illustrates an initial period during which dewatering is started, in which the speed of the drain motor changes with increasing speed of the main motor.

Accordingly, the water level increases or decreases repeatedly, and the speed of the main motor goes up and then gradually decreases along with the operation of the drain motor, thereby completing dewatering.

Figure 11:
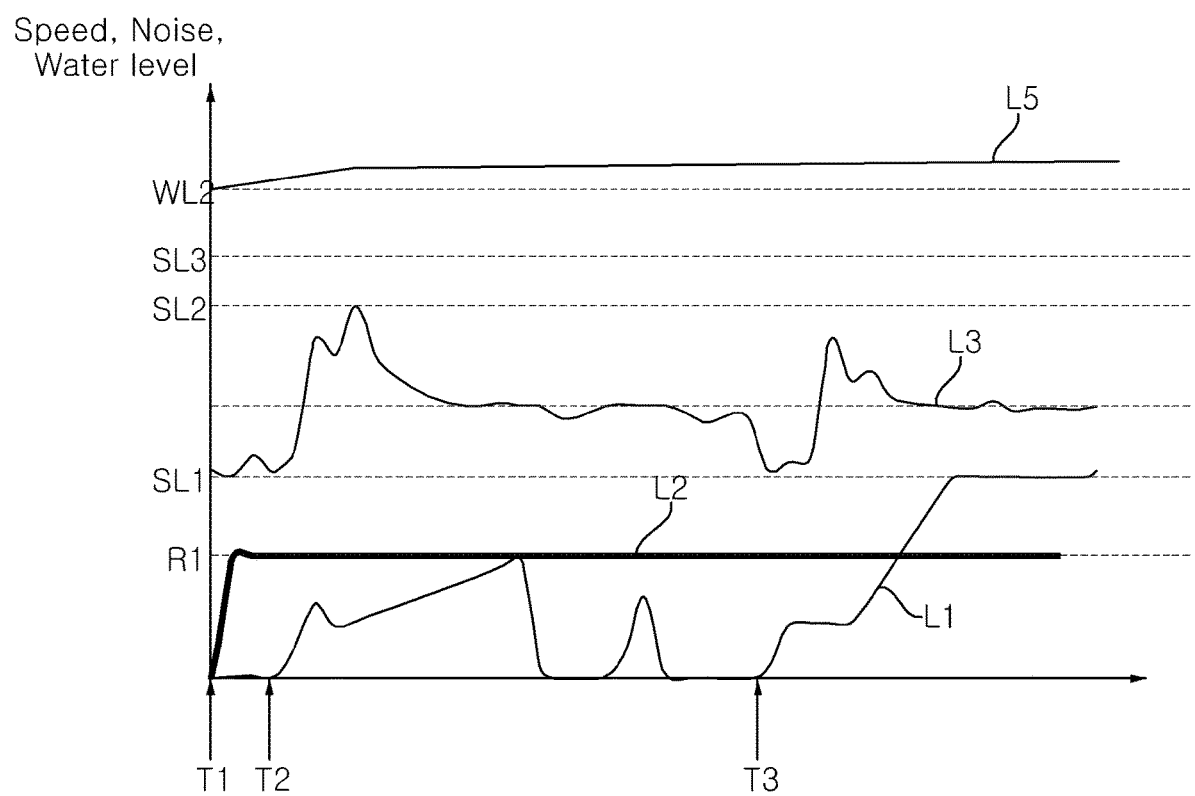
FIG. 11 is a view illustrating changes in noise caused by the start-up of the pump of a laundry treatment machine according to an embodiment of the present disclosure.

FIG. 11 is a view illustrating changes in noise caused by the start-up of the pump of a laundry treatment machine according to an embodiment of the present disclosure.

The first graph L1 shows the speed of the main motor, the second graph L2 shows the speed of the drain motor, and the third graph L3 shows changes in noise.

As shown in FIG. 11, in case in which the drain motor keeps operating without stopping, noise generated in the start-up of the drain motor is eliminated, which leads to less noise compared to FIG. 8.

Although there is noise generated by the start-up of the main motor, the amount of noise decreases as the drain motor keeps operating at the first speed R1. Although noise is generated during the operation of the drain motor, the amount of this noise is smaller than the amount of noise generated by the start-up, as compared to the above-explained FIG. 8.

When the drain motor operates at the first speed, the amount of noise increases from the first level SL1 to the second level SL2, which is lower than the third level, and then decreases.

As compared to the above-explained FIG. 8, the drain motor keeps operating at low speed without stopping operation, and therefore the maximum noise is reduced from the third level to the second level.

For example, in case in which the drain motor repeatedly turns on and off during a period in which the main motor operates at low speed, a maximum of 50 db of noise is generated. On the other hand, in case in which the drain motor rotates at speed and increases its speed again without stopping operation, a maximum of 43 dB of noise is generated, which is similar to the amount of noise generated under a normal drainage situation.

The amount of noise reduction is about 8 dB of noise, as compared to the on and off control of the drain motor.

Accordingly, the drain pump is not started up after stopping but rotates at a low speed which is preset while the drain pump is stopped. Thus, the drain pump is not started up, thereby reducing the start-up noise.

Figure 12:
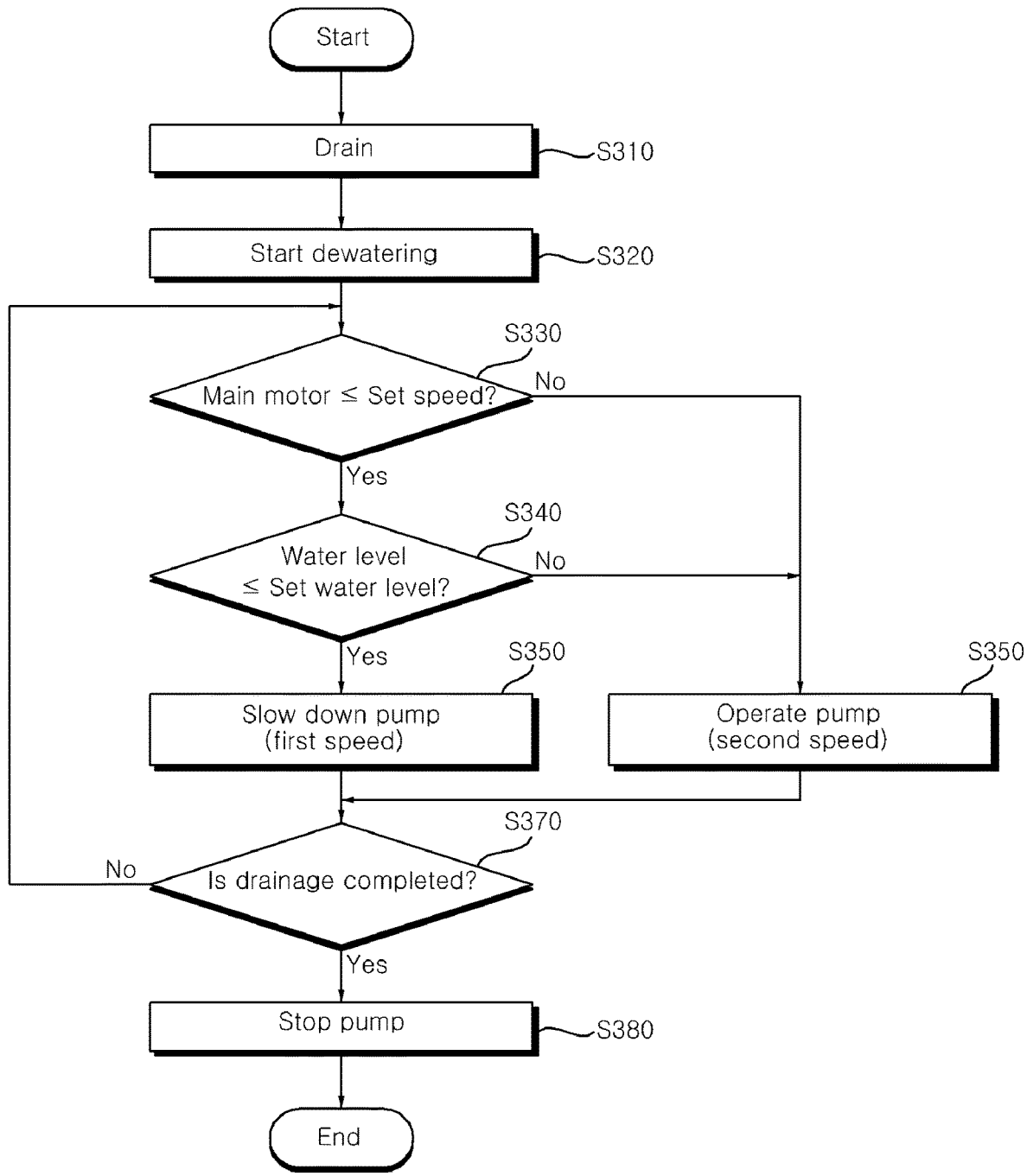
FIG. 12 is a sequential chart illustrating a method for controlling a drain pump to drain wash water, in a laundry treatment machine according to an embodiment of the present disclosure.

FIG. 12 is a sequential chart illustrating a method for controlling a drain pump to drain wash water, in a laundry treatment machine according to an embodiment of the present disclosure.

As shown in FIG. 12, the main controller operates the drain pump to drain wash water (S310). The drain pump operates at a preset rotation speed to drain wash water.

The main controller applies a control signal to the driver so that the main motor rotates, and the washing tub rotates as the main motor operates, thereby releasing the wash water contained in the laundry.

The main controller controls the main motor to stop operation after the main motor speeds up to a set speed and then to speed up in stages and rotate at high speed to perform dewatering.

Moreover, the main controller may control the drain pump by setting a plurality of periods according to the speed of rotation of the main motor.

In case in which the main motor stops operation, the main controller may control the drain pump when the current speed of the main motor is at a set speed or below (S330).

Furthermore, in case in which the level of wash water inputted from a water level sensor is a set water level or below (S340), the main controller controls the drain motor to operate at a first speed S1, which is a low speed, without stopping operation. The drain pump driving apparatus controls the drain pump to operate at the first speed without stopping operation.

When the drain motor operates at the first speed, the wash water in the washing tub is introduced into the drain pump, and when the drain motor operates at the second speed, the introduced wash water is drained.

Meanwhile, in case in which the water level increases while the main motor is rotating at a low speed below the set speed, the drain pump driving apparatus increases the speed of rotation of the drain motor so as to operate it at the second speed (S350).

Until completion of drainage and dewatering (S370), the drain pump driving apparatus repeats the operation by controlling the speed of rotation of the drain motor to drain wash water.

Upon completion of drainage, the drain pump driving apparatus stops the drain motor, and accordingly the drain pump stops operation (S380).

The main controller performs the following operation. For example, the main controller may supply wash water to perform rinsing when drainage is performed after a wash cycle, perform the next rinse cycle when drainage is performed during rinsing, and perform dewatering when drainage is performed after the final rinse cycle.

Accordingly, the present disclosure can improve drainage performance, reduce the time taken to start up the motor of the pump, and reduce noise since the pump keeps operating without stopping as the speed of the pump goes up or down during drainage and dewatering.

The laundry treatment machine according to embodiments of the present disclosure are not limited to the configurations and methods of the above-described embodiments, and various modifications to the embodiments may be made by selectively combining all or some of the embodiments.

Meanwhile, a method for operating a drain pump driving apparatus and a laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:
   a washing tub;
   a main motor to rotate the washing tub;
   a drain pump;
   a pump motor to operate the drain pump;
   a pump driving apparatus to drive the pump motor; and
   a main controller to control the main motor and the pump motor,
   wherein, when the main motor repeatedly turns on and off, the main controller controls the pump motor to slow down to a set speed without stopping operation and then speed up.

2. The laundry treatment machine of claim 1, wherein, when the main motor is stopped, the main controller controls the pump motor to operate at a first speed without stopping operation.

3. The laundry treatment machine of claim 2, wherein, when the main motor is operating, the main controller controls the pump motor to speed up to a second speed greater than the first speed, and operate at the second speed.

4. The laundry treatment machine of claim 1, wherein the main controller controls the drain pump to keep operating without stopping operation during dewatering.

5. The laundry treatment machine of claim 1, wherein, when the pump motor operates between a first speed and a second speed during dewatering, the level of wash water in the washing tub varies.

6. The laundry treatment machine of claim 1, wherein when a speed of the main motor decreases to below another set speed and a level of wash water increases, during dewatering, the main controller is configured to increase a speed of rotation of the pump motor.

7. The laundry treatment machine of claim 1, wherein, when a level of wash water from a water level sensor is a set water level or below, the main controller controls the pump motor to operate at a first speed without stopping operation.

8. The laundry treatment machine of claim 1,
   wherein, when the main motor is stopped, the main controller controls the pump motor to operate at a first speed without stopping operation,
   wherein, when the main motor is operating, the main controller controls the pump motor to speed up to a second speed greater than the first speed, and operate at the second speed,
   wherein, during drainage, the main controller controls the pump motor to operate at a third speed greater than the second speed, and slows down the pump motor from the third speed to the second speed or the first speed when the level of wash water decreases.

9. The laundry treatment machine of claim 1, wherein, during dewatering, the main controller controls the pump motor to operate at a first speed and maintain the first speed for a predetermined amount of time when the main motor is stopped.

10. The laundry treatment machine of claim 6, wherein the main controller controls the pump motor to vary in speed based on the level of wash water when the main motor operates at above the another set speed.

11. A laundry treatment machine comprising:
    a washing tub;
    a main motor to rotate the washing tub;
    a drain pump;
    a pump motor to operate the drain pump;
    a pump driving apparatus to drive the pump motor; and
    a main controller to control the main motor and the pump motor,
    wherein, when the level of wash water in the washing tub varies while a speed of the main motor is below a first set speed, the main controller controls the pump motor to slow down to a second set speed without stopping operation and then speed up.

12. The laundry treatment machine of claim 11, wherein, when the main motor is operating at below the first set speed and the level of wash water is below a set water level, the main controller controls the pump motor to slow down and operate at a first speed, and when the level of wash water is the set water level or above, the main controller controls the pump motor to operate at a second speed.

13. The laundry treatment machine of claim 12, wherein, when the main motor is operating at below the first set speed and the level of wash water is the set water level or above, the main controller controls the pump motor to operate at a third speed greater than the second speed.

14. A method for controlling a laundry treatment machine, the method comprising:
    draining wash water by a drain pump by driving a pump motor;

starting dewatering by driving a main motor; and when the main motor repeatedly turns on and off, operating the pump motor to slow down to a set speed without stopping operation and then speed up.

15. The method of claim 14, further comprising:

when a speed of the main motor decreases below another set speed during dewatering and a level of wash water increases, increasing a speed of rotation of the pump motor.

16. The method of claim 14, further comprising, when a level of wash water is a set water level or below, operating the pump motor at a first speed without stopping operation.

17. The method of claim 14, further comprising:

when the main motor is stopped, operating the pump motor at a first speed without stopping operation;

when the main motor is operating, speeding up the pump motor to a second speed greater than the first speed and operating the pump motor at the second speed;

when drainage is started, operating the pump motor at a third speed greater than the second speed;

when the level of wash water decreases, slowing down the pump motor and operating the same at the second speed; and when the speed of the main motor is below another set speed, operating the pump motor at the first speed.

18. The method of claim 14, further comprising, when the speed of the main motor goes up to another set speed or above, changing the speed of the pump motor based on the level of wash water.

* * * * *